(12) United States Patent
Vissenberg et al.

(10) Patent No.: US 9,274,270 B2
(45) Date of Patent: Mar. 1, 2016

(54) LIGHT OUTPUT DEVICE WITH MOVABLE LIGHTGUIDE SYSTEM

(75) Inventors: Michel Cornelis Josephus Marie Vissenberg, Roermond (NL); Ramon Pascal van Gorkom, Eindhoven (NL); Peter Johannes Martinus Bukkems, Deurne (NL); Mark Johannes Antonius Verhoeven, Deurne (NL); Andreas Aloysius Henricus Duijmelink, Helmond (NL); Monica Antonia Maria De Wilt, Roermond (NL); Richard Josephus Arnoldus Maria Foederer, Mierlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 214 days.

(21) Appl. No.: 14/006,973

(22) PCT Filed: Mar. 26, 2012

(86) PCT No.: PCT/IB2012/051422
§ 371 (c)(1),
(2), (4) Date: Dec. 20, 2013

(87) PCT Pub. No.: WO2012/131560
PCT Pub. Date: Oct. 4, 2012

(65) Prior Publication Data
US 2014/0133172 A1    May 15, 2014

(30) Foreign Application Priority Data

Mar. 28, 2011  (EP) .................................... 11159929

(51) Int. Cl.
*F21V 8/00* (2006.01)
*F21V 14/00* (2006.01)
(Continued)

(52) U.S. Cl.
CPC ................ *G02B 6/0096* (2013.01); *F21K 9/52* (2013.01); *F21S 6/003* (2013.01); *F21V 14/00* (2013.01);
(Continued)

(58) Field of Classification Search
CPC ........... F21V 14/00; G02B 6/001; F21K 9/52; F21S 6/002; F21S 6/003
USPC ................................................... 362/551, 555
See application file for complete search history.

(56) References Cited

U.S. PATENT DOCUMENTS 5,301,090 A * 4/1994 Hed ............................... 362/558
7,000,624 B2 * 2/2006 Chang ............................. 135/16
(Continued)

FOREIGN PATENT DOCUMENTS

CN    201428983 Y    3/2010
DE    4209957 A1    9/1993

*Primary Examiner* — Anabel Ton
(74) *Attorney, Agent, or Firm* — Meenakshy Chakravorty

(57) ABSTRACT

The invention relates to a light-output device (1; 10; 30) controllable to provide different light-output functions. The light-output device comprises a light-source arrangement (12; 31) configured to emit light; and a light-guiding system (10; 32) arranged to receive the light and configured to guide the light to at least one light-output surface of the light-guiding system. The light-guiding system (10; 32) comprises at least a first light-guide (11b; 37) and a second light-guide (11a; 40, 41); and the light-guiding system (10; 32) is movable relative to the light-source arrangement (12; 31) between at least a first position where light output by the light-source arrangement is guided by the first light-guide (11b; 37) to provide a first light-output function, and a second position where light output by the light-source arrangement is guided by the second light-guide (11a; 40, 41) to provide a second light-output function, different from the first light-output function. The present invention is based on the realization that different light-output functions conveniently and intuitively can be achieved by moving a light-guiding system comprising at least two light-guides relative to a stationary light-source arrangement. Hereby, different light-output functions can be achieved with a single stationary light-source arrangement.

15 Claims, 4 Drawing Sheets

(51) Int. Cl.
  *F21V 14/02*  (2006.01)
  *F21K 99/00*  (2010.01)
  *F21V 14/06*  (2006.01)
  *F21S 6/00*  (2006.01)
  *F21W 131/301*  (2006.01)
  *F21Y 101/02*  (2006.01)
  *G02B 6/35*  (2006.01)

(52) U.S. Cl.
  CPC ................ *F21V 14/02* (2013.01); *F21V 14/06* (2013.01); *G02B 6/0001* (2013.01); *F21S 6/002* (2013.01); *F21W 2131/301* (2013.01); *F21Y 2101/02* (2013.01); *G02B 6/0006* (2013.01); *G02B 6/0031* (2013.01); *G02B 6/0075* (2013.01); *G02B 6/3504* (2013.01)

(56) References Cited

U.S. PATENT DOCUMENTS

| | | | |
|---|---|---|---|
| 7,513,666 | B2 | 4/2009 | Ishikura et al. |
| 7,905,645 | B2 * | 3/2011 | Batti et al. ................ 362/555 |
| 8,282,256 | B1 * | 10/2012 | Pike et al. ................ 362/555 |
| 8,905,611 | B2 * | 12/2014 | Connor ................ 362/554 |
| 2002/0001202 | A1 * | 1/2002 | Williams et al. ........... 362/572 |
| 2006/0120092 | A1 | 6/2006 | Sapper |
| 2006/0274549 | A1 | 12/2006 | Fukuyoshi |
| 2008/0232107 | A1 | 9/2008 | Hsu |
| 2011/0075441 | A1 * | 3/2011 | Swessel et al. ............ 362/554 |
| 2014/0029248 | A1 * | 1/2014 | Dyson et al. ............. 362/218 |

* cited by examiner

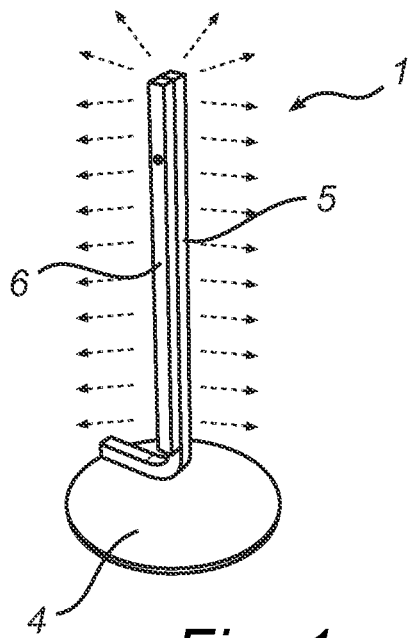
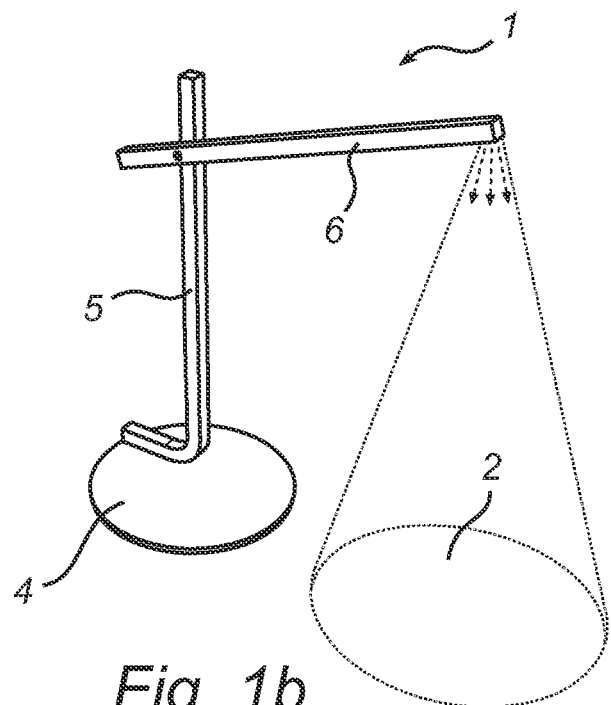
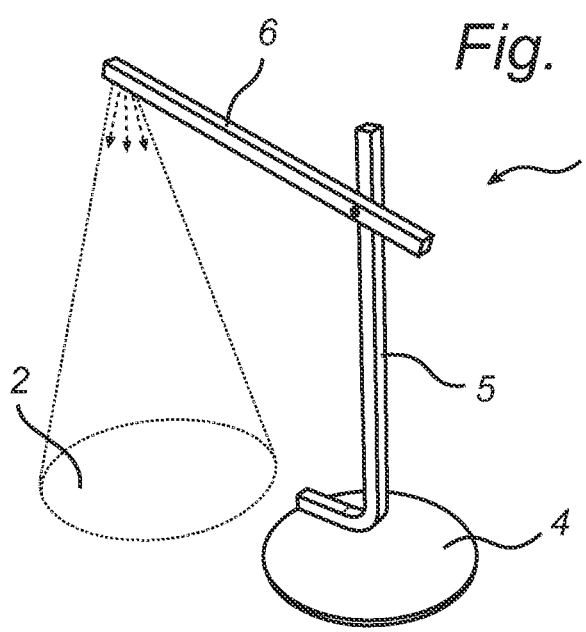
Fig. 1a
Fig. 1b
Fig. 1c

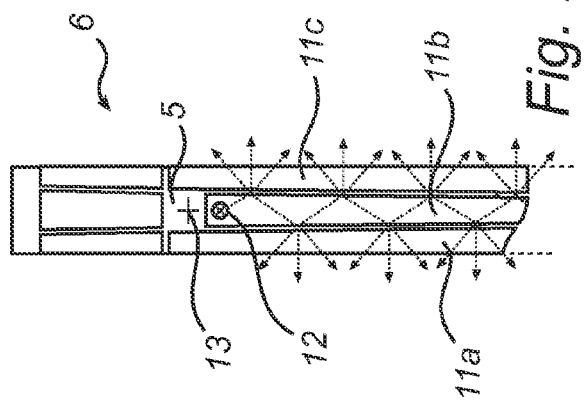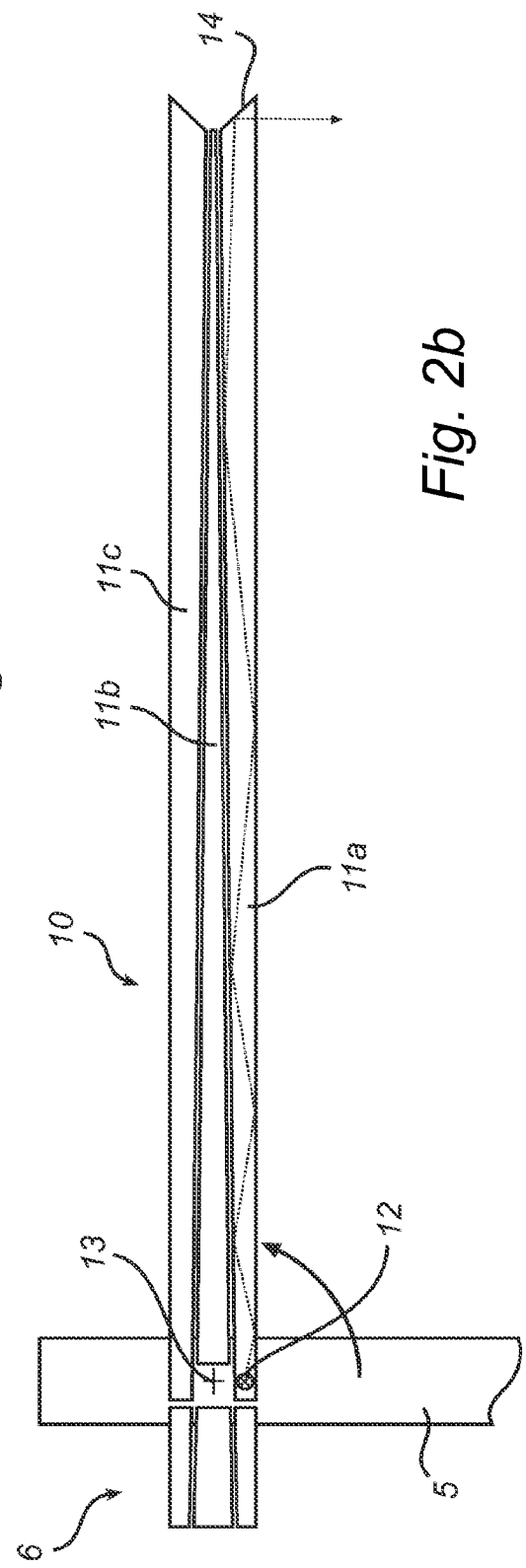

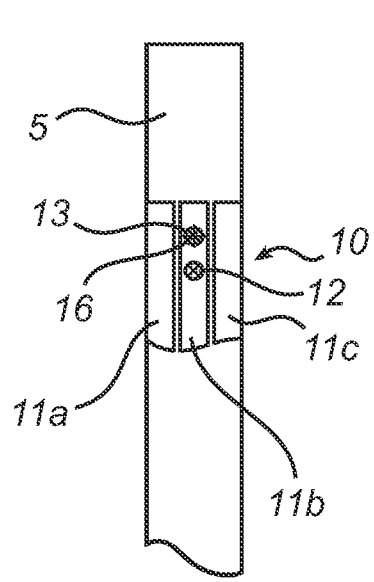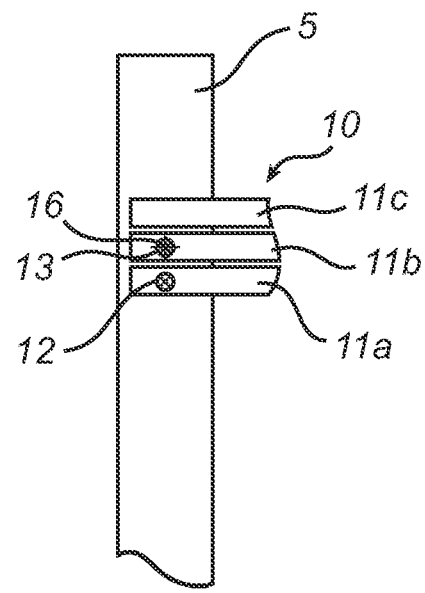
Fig. 3a        Fig. 3b
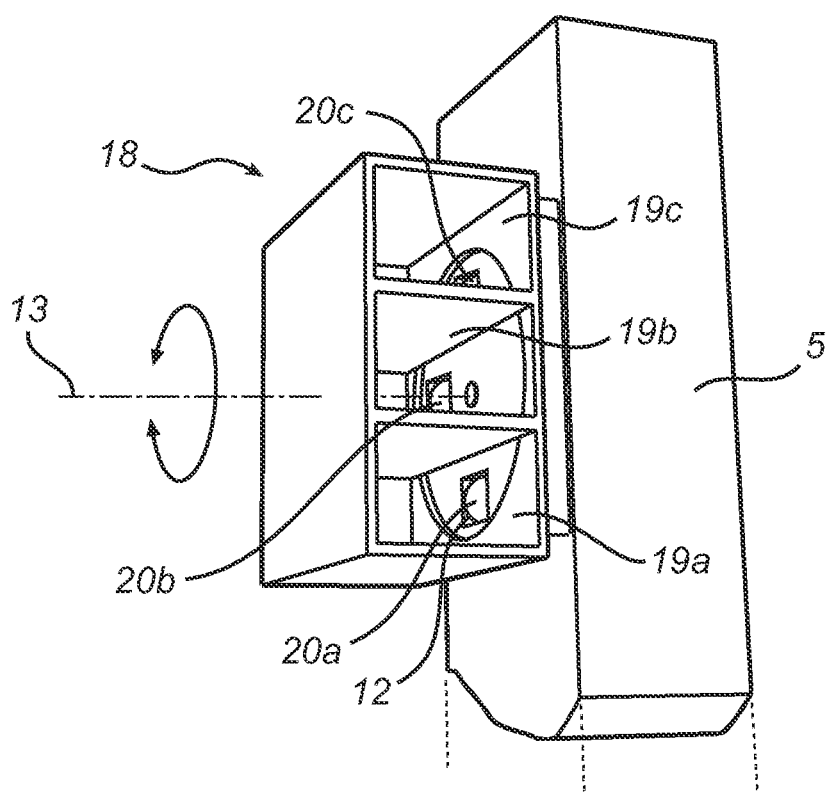
Fig. 4

LIGHT OUTPUT DEVICE WITH MOVABLE LIGHTGUIDE SYSTEM

FIELD OF THE INVENTION

The present invention relates to a light-output device controllable to provide different light-output functions.

BACKGROUND OF THE INVENTION

Through the increasing availability of more compact light-sources that may not need to be replaced over the lifetime of a luminaire, new design and functionality has become possible.

For example, it should be possible to provide different lighting functions, such as general illumination and concentrated task lighting using a single light-output device with several sets of light-sources, such as LEDs, that are appropriately arranged and that are individually controllable. However, this might result in a relatively complicated and costly light-output device.

SUMMARY OF THE INVENTION

In view of the above-mentioned and other drawbacks of the prior art, a general object of the present invention is to provide an improved light-output device that is controllable to provide different light-output functions.

According to the present invention there is provided a light-output device controllable to provide different light-output functions, comprising: a light-source arrangement configured to emit light; and a light-guiding system arranged to receive the light and configured to guide the light to at least one light-output surface of the light-guiding system, wherein: the light-guiding system comprises at least a first light-guide and a second light-guide; and the light-guiding system is movable relative to the light-source arrangement between at least a first position where light output by the light-source arrangement is guided by the first light-guide to provide a first light-output function, and a second position where light output by the light-source arrangement is guided by the second light-guide to provide a second light-output function, different from the first light-output function.

A "light-output function" may refer to any property of the light that is output by the light-output device. For example, different light-output functions may be provided by light having different, color, color temperature, intensity, output surface, angular distribution and/or spatial distribution. For instance, an "ambience function" may be provided by emitting low intensity light having a low color temperature over a relatively large output surface and a "task function" may be provided through a relatively concentrated beam of high intensity light having a higher color temperature.

The present invention is based on the realization that different light-output functions conveniently and intuitively can be achieved by moving a light-guiding system comprising at least two light-guides relative to a stationary light-source arrangement. Hereby, different light-output functions can be achieved with a single stationary light-source arrangement.

Hereby, the light-source can be used efficiently, with a high utilization.

Furthermore, there is no need for additional components, such as further heat sinks, control units etc, which allows for a cost-efficient light-output device with relatively low complexity.

Moreover, the light-output device is simple and intuitive to use, since the only user intervention required to switch between the different light-output functions is to move the light-guiding system relative to the light-source arrangement.

The light may be output through a first light-output surface of the light-guiding system to provide the first light-output function and through a second light-output surface of the light-guiding system, different from the first light-output surface, to provide the second light-output function.

According to various embodiments of the light-output device according to the present invention, at least one of the first and second light-guides may advantageously be configured to guide light from an incoupling surface of the light-guide to an outcoupling surface of the light-guide through multiple reflections of the light at a boundary surface of the light-guide.

The at least one light-guide may be configured to guide the light through total internal reflection (TIR). In this case, the at least one light-guide may be made of a suitable material having a refractive greater than 1. Examples of suitable materials for a TIR light-guide include glass, PMMA, PC etc. Various other materials will be well known to those skilled in the art.

Alternatively, the at least one light-guide may be at least partly hollow, with an at least partly reflective boundary for guiding the light through multiple reflections.

Moreover, any one or both of the first and second light-guides may comprise means for controlling the out-coupling of light from the light-guide(s). Such means may, for example, include one or several mirrors or lenses, or structures that locally modify the optical properties of the light-guide. The light-guide may, for example, comprise out-coupling structures at the boundary of the light-guide and/or redirecting or scattering structures or particles inside the light-guide. The out-coupling structures may also comprise paint (white or colored) or phosphors. How to achieve and control the out-coupling of light from a light-guide will be well known to those skilled in the art.

According to various embodiments of the light-output device according to the present invention, the first light-guide may have a cross-section area that decreases with increasing distance from the in-coupling surface. Such a tapering light-guide may, for example, be used to provide the light-output function of "glow", with a relatively large light-output surface. To further control and/or distribute the out-coupling of light from the first light-guide, it may be provided with any of the above-mentioned means for controlling the out-coupling of light from the light-guide.

Furthermore, the second light-guide may comprise a reflector arranged to direct the light through the out-coupling surface of the second light-guide. This configuration may be particularly useful for providing the light-output function of "task light"—a beam of light directed at a targeted area, which may, for example, be a work space or a highlighted area. In the case of the second light-guide being a generally rod-shaped TIR light-guide, the second light-guide may comprise a reflector arranged at an end of the rod-shaped TIR light-guide. The reflector may be angled in relation to the principal direction of extension of the light-guide to direct the light guided by the light-guide towards a targeted area. Sometimes, it may be desirable to collimate the light between the in-coupling surface and the out-coupling surface. To that end, the cross-section area of the light-guide may be increasing with increasing distance from the in-coupling surface.

According to various embodiments, the light-guiding system may further comprise at least a first light-mixing device for providing light from the light-source arrangement to the first light-guide and a second light-mixing device for providing light from the light-source arrangement to the second light-guide.

The light-mixing device may be any device capable of receiving rays of light output by a light-source, mixing the rays of light through, for example, reflection and/or scattering, and outputting mixed light with rays of light in more directions than were received. For example, the light-mixing device may be a so-called mixing chamber, which is a void with reflective walls, which may advantageously be scattering. Various light-mixing devices are well known to those skilled in the art.

Through the provision of one or several light-mixing device(s), the tolerance in the positioning of the light-guiding system in relation to the light-source arrangement can be increased, providing for an increased robustness and/or decreased cost of the light-output device.

According to various embodiments, the light-guiding system may be rotatable relative to the light-source arrangement around an axis of rotation.

This axis of rotation may be oriented such that the light-guiding system is rotatable in a plane perpendicular to the axis of rotation. This may, for example be useful when it is desired to illuminate a work area or similar at some distance from the light-output device. Through rotation, the light-output area of the light-guiding system can be brought physically closer to the area to be illuminated.

Alternatively, the axis of rotation may be oriented to be substantially in parallel with the principal direction of extension of the light-guiding system. Hereby, a movement of the light-guiding system in relation to the light-source arrangement and accompanying transition in light-output function can be achieved substantially without changing the form factor of the light-output device. For instance, the light-guide arrangement may be arranged for substantially coaxial rotation around the axis of rotation so that a first light-output function is provided for a first coaxial rotation state and a second light-output function is provided for a second coaxial rotation state. In this case, the light-output device will have the same physical appearance in the two states, while providing different light-output functions.

To conveniently achieve that the light emitted by the light-source is guided by different light-guides depending on the position of the light-guiding system relative to the light-source arrangement, the light-source arrangement may comprises a light-source arranged offset from the axis of rotation. When the light-guiding system is rotated about the axis of rotation, the light-source will have different positions relative to the light-guiding systems for different angles of rotations.

The light-source arrangement may comprise additional light-sources, which may be arranged offset from the axis of rotation, and/or which may be arranged to coincide with the axis of rotation. With a light-source that is arranged to coincide with the axis of rotation, the output from that light-source may contribute equally to both the first light-output function and the second light-output function.

According to other embodiments, the light-guiding system may be displaceable relative to the light-source arrangement. The light-guiding system may be displaceable along any path. For example, the light-guiding system may be arranged to be displaced substantially linearly, so that the light-source arrangement emits light into the light-guiding system at different positions along the light-guiding system depending on the position of the light-guiding system along a linear path.

Furthermore, in various embodiments of the present invention, the light-guiding system may comprise a first portion and a second portion, where the first portion is rotatable relative the second portion. The first portion may then advantageously be rotatable about a rotational axis that is substantially perpendicular to the principal direction of extension of the light-guiding system. Hereby, the light-output function can be further modified. For example, the direction of a relatively concentrated beam of light intended for a task light function may be controlled by rotating the end of the light-guiding system, or an individual light-guide comprised in the light-guiding system.

Moreover, the light-source arrangement may comprise at least one light-emitting diode (LED), which may be in thermal connection with a heat sink, to dissipate the heat generated by the LED.

BRIEF DESCRIPTION OF THE DRAWINGS

These and other aspects of the present invention will now be described in more detail, with reference to the appended drawings showing example embodiments of the invention, wherein:

FIGS. 1a-c are schematic illustrations of an exemplary embodiment of the light-output device according to the present invention providing different light-output functions;

FIGS. 2a-b schematically illustrate the guiding of light through the light-guiding system of the light-output device in FIGS. 1a-c when providing two different light-output functions;

FIGS. 3a-b schematically illustrate another embodiment of the light-output device in FIG. 1 in which the light-source arrangement comprises two light-sources arranged in different locations in relation to the axis of rotation of the light-guiding system;

FIG. 4 schematically illustrates a further embodiment of the light-output device in FIG. 1 comprising a light-mixing chamber for improved mixing of light.

DESCRIPTION OF EXAMPLE EMBODIMENTS OF THE PRESENT INVENTION

Figure 5A:
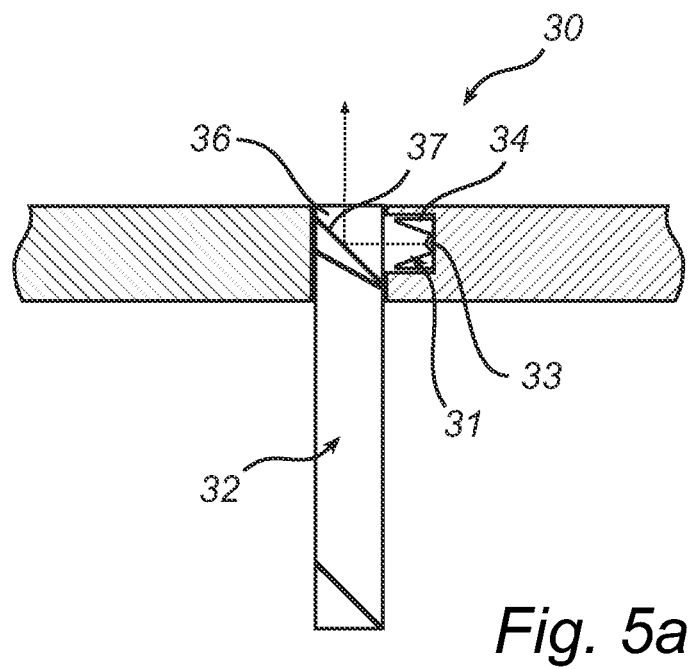
FIGS. 5a-b schematically illustrate yet another embodiment of the light-output device according to the present invention, in which the light-guiding system is linearly displaceable in relation to the light-source arrangement.

FIGS. 1a-c schematically illustrate a first exemplary embodiment of the light-output device according to the present invention, in the form of a free-standing table-top lamp 1 providing different light-output functions in the different figures. In FIG. 1a, a "glow" function is provided, in which a large portion of the lamp 1 outputs light having a relatively low intensity and low color temperature, and FIGS. 1b-c show a "task" function for different orientations of the lamp 1. The "task" function may involve outputting light having a relatively high intensity and high color temperature through a small portion of the lamp 1 and directed towards a task area 2.

The lamp 1 in FIGS. 1a-c comprises a plate 4 for keeping the lamp 1 stably standing, a stand 5 attached to the plate 4 and a movable arm 6 that is rotatably connected to the stand 5. As will be described in more detail below, the lamp 1 further comprises a light-source arrangement provided as a part of the stand 5, and the movable arm 6 comprises a light-guiding arrangement for guiding the light-output by the light-source arrangement to provide the different light-output functions that are indicated in FIGS. 1a-c.

The guiding of light through the light-guiding arrangement comprised in the movable arm 6 will now be described in more detail for an example configuration with reference to FIGS. 2a-b.

In this example configuration, the movable arm 6 comprises a light-guide system 10 including three slab light-guides 11a-c functioning through total internal reflection (TIR) of light. Moreover, the stand 5 comprises a light-guide arrangement that includes a light-source 12 in the form of a light-emitting diode (LED).

The light-guide system 10 is rotatable relative to the stand 5 (and relative to the LED 12) about an axis of rotation 13 so that the light output by the LED 12 is in-coupled into different light-guides 11a-c depending on the rotational state of the arm 6. To this end, the LED 12 is arranged offset from the axis of rotation 13 as is schematically indicated in FIGS. 2a-b.

FIG. 2a schematically shows a portion of the lamp 1 in the state shown in FIG. 1a, where the movable arm is pointing downwards and arranged along the stand 5. In this state, the light that is emitted by the LED 12 will be in-coupled to the centrally located light-guide 11b, where it will be guided towards the tip of the arm 6 through total internal reflection as is schematically indicated in FIG. 2a. In order to achieve the desired glow function, the center light-guide 11b is tapered to have a cross-sectional area that decreases along the length of the light-guide 11b. In this way, light can be out-coupled substantially continuously along the light-guide 11b. To further control the out-coupling of light, the center light-guide may further (or as an alternative) be provided with out-coupling means, such as structures that locally modify the angle of reflection so that the TIR condition is not fulfilled for a portion of the light.

FIG. 2b schematically shows a portion of the lamp 1 in the state shown in FIG. 1b, where the movable arm has been rotated counter clockwise by 90° relative to the state that is illustrated in FIG. 2a. In this state, the light that is emitted by the LED 12 will be in-coupled to the side light-guide 11a, where it will be guided towards the tip of the arm 6 through total internal reflection as is schematically indicated in FIG. 2b. At the tip of the arm 6, the light is reflected downwards by a reflector 14 provided at the end of the light-guide 11a. As can be seen in FIG. 2b, the light-guide 11a is configured such that there is substantially no out-coupling of light along the light-guide 11a. Accordingly, there are no out-coupling structures provided along the light-guide 11a (the same applies to the other side light-guide 11c), and, furthermore, the light-guide 11a has an increasing cross-sectional area towards the end of the arm 6. Hereby, the light will also be collimated.

According to another example configuration that is schematically illustrated in FIGS. 3a-b, the light-guide arrangement includes an additional light-source 16 in the form of a light-emitting diode (LED). This additional light-source 16 is arranged at the axis of rotation 13 as is schematically indicated in FIGS. 3a-b.

FIG. 3a schematically shows a portion of the lamp 1 in the state shown in FIG. 1a, where the movable arm is pointing downwards and is arranged along the stand 5. In this state, the light that is emitted by both the LED 12 that is arranged offset from the axis of rotation 13 and the LED 16 that is arranged at the axis of rotation 13 will be in-coupled to the centrally located light-guide 11b, where it will be guided towards the tip of the arm 6 through total internal reflection. The light that is output by the lamp when in the configuration of FIG. 3a will thus be determined by the combination of the light output by both the LEDs 12 and 16.

FIG. 3b schematically shows a portion of the lamp 1 in the state shown in FIG. 1b, where the movable arm has been rotated counter clockwise by 90° relative to the state that is illustrated in FIG. 3a. In this state, the light that is emitted by the LED 12 will be in-coupled to the side light-guides 11a, where it will be guided towards the tip of the arm 6. The light that is emitted by the LED 16 will still be guided towards the tip of the arm 6 by the center light-guide 11b, and will be gradually out-coupled along the light-guide 11a as was described above with reference to FIG. 2a.

In the example configuration of FIGS. 3a-b, the offset LED 12 may, for example, be a cool white LED, and the additional LED 16 may be a red LED. In that case, the light that is output when the lamp 1 is in the state shown in FIG. 3a will be warm white (suitable for the glow function). In the state shown in FIG. 3b, the task light emitted from the lower light guide 11b will be concentrated cool white light, and the arm 6 will emit a red glow.

In the example configurations of FIGS. 2a-b and FIGS. 3a-b, the light emitted by the LED(s) may be in-coupled to the appropriate light-guides 11a-c through conventional in-coupling facets, such as parabolic TIR facets or reflector facets. When such in-coupling facets are used, relatively accurate positioning of the in-coupling facets relative to the LED(s) may be required to achieve the desired light-output functions. To provide for a greater tolerance to errors in the positioning of the light-guide system in relation to the light-source arrangement, the light-guide system may advantageously be provided with a light-mixing device. A further example configuration of the lamp 1 in FIGS. 1a-c comprising such a light-nixing device will now be described with reference to FIG. 4.

FIG. 4 schematically shows a portion of the lamp 1 in FIGS. 1a-c where the light-guide system has been removed to allow for an unobstructed view of the light-mixing device 18. Thus, FIG. 4 schematically illustrates an example configuration in which the light-guide system comprises a light-mixing device 18 that is rotatably connected to the stand 5 of the lamp 1. Although these are not shown in FIG. 4, the light-guide system further comprises light-guides which may have similar configurations as was described above with reference to FIGS. 2a-b and FIGS. 3a-b. These light-guides are arranged to receive light output by the light-mixing device 18.

As can be seen in FIG. 4, the light-mixing device 18 is configured to be rotatable about the axis 13 of rotation, and the light-source arrangement comprises an LED 12 that is offset from the axis 13 of rotation.

In this exemplary configuration, the light-mixing device 18 comprises three mixing chambers 19a-c. The mixing chambers 19a-c are here provided in the form of three voids inside a block of highly reflective (preferably white scattering) material. Each mixing chamber 19a-c has a light entry hole 20a-c that faces the side where the LED 12 may be positioned (depending on the rotation angle of the arm 6), and a light exit hole (the open end of the void 19a-c) for feeding the appropriate light guide with light.

The shape, size, and position of the light entry holes 20a-c determine the transition effect (e.g. at which angle the transition takes place and how smooth the transition is) in a very robust manner. The mixing chambers may also be partly connected (i.e. leaking light towards each other), in case the transition should be between intermediate intensities, instead of between full on and full off.

Various configurations of a light-output device (the lamp 1 in FIGS. 1a-c) in which the transition between different light-output functions is controlled by rotating the light-guide system in relation to the light-source arrangement have been described above. Another embodiment of the light-output device according to the present invention, in which the transition between different light-output functions is controlled by linearly displacing the light-guide system will now be described with reference to FIGS. 5a-b.

Figure 5B:
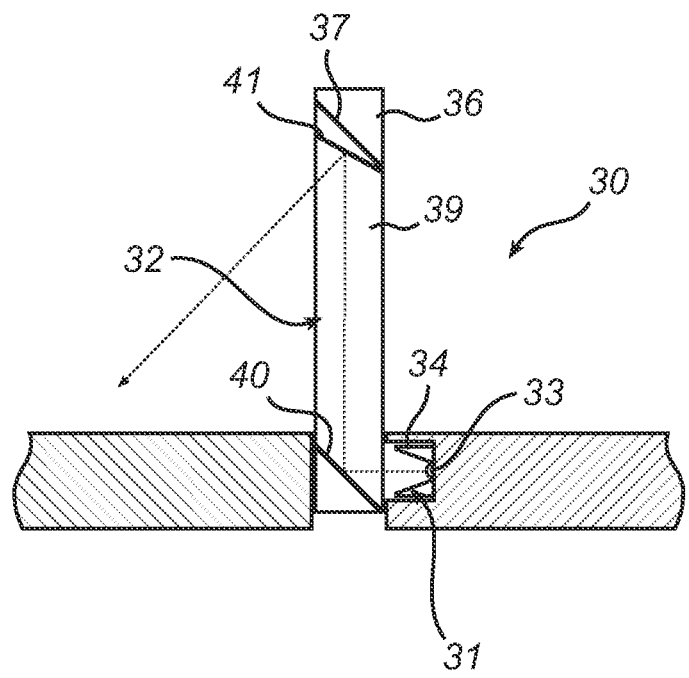

The light-output device 30 in FIGS. 5a-b comprises a stationary light-source arrangement 31 which is here shown to be embedded in an object, which could be an electronic device, such as an alarm clock or a piece of furniture, such as a table, and a light-guide system 32. The light-source arrangement 31 comprises an LED 33 and a collimator 34, and the light-guide system 32 is vertically displaceable in relation to the light-source arrangement 31 between two positions as is schematically illustrated in FIGS. 5a-b.

In FIG. 5a, the light-output device 30 is in a first state with the light-guide system 32 arranged in an inserted position in order to provide a first light-output function ("uplight") as is indicated by the arrow in FIG. 5a. As can be seen in FIG. 5a, the light output by the LED 33 enters a first transparent member 36 comprised in the light-guide system 32 and is then reflected upwards at a first reflector 37.

In FIG. 5b, the light-output device 30 is in a second state with the light-guide system 32 arranged in an extended position in order to provide a second light-output function ("task light") as is indicated by the arrow in FIG. 5b. As can be seen in FIG. 5b, the light output by the LED 33 now enters a second transparent member 39 comprised in the light-guide system 32 and is then reflected upwards at the second 40 reflector, to then be directed towards a work area or similar by a third 41 reflector. Although this is not explicitly shown in FIGS. 5a-b, it should be noted that an end portion of the light-guide system 32 (including the third reflector 41) may be rotatable in relation to the remainder of the light-guide system (including the second reflector) about an axis of rotation that substantially coincides with the length axis of the light-guide system 32, so that the direction of the task light can be controlled through rotation of the end portion.

Additionally, variations to the disclosed embodiments can be understood and effected by the skilled person in practicing the claimed invention, from a study of the drawings, the disclosure, and the appended claims. For example, other types of light-guides than slab light-guides may be used, such as light-guides defined by reflectors.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. A light-output device controllable to provide different light-output functions, comprising:
   a light-source arrangement configured to emit light; and
   a light-guiding system arranged to receive said light and configured to guide said light to at least one light-output surface of the light-guiding system, wherein:
   said light-guiding system comprises at least a first light-guide and a second light-guide; and
   said light-guiding system is movable relative to said light-source arrangement between at least a first position where light output by said light-source arrangement is guided by said first light-guide to provide a first light-output function, and a second position where light output by said light-source arrangement is guided by said second light-guide to provide a second light-output function, different from the first light-output function, and
   said light-guiding system further comprising at least a first light-mixing chamber for providing light from said light-source arrangement to said first light-guide and a second light-mixing chamber for providing light from said light-source arrangement to said second light-guide.

2. The light-output device according to claim 1, wherein said light is output through a first light-output surface of the light-guiding system to provide said first light-output function and through a second light-output surface of the light-guiding system, different from the first light-output surface, to provide said second light-output function.

3. The light-output device according to claim 1, wherein at least one of said first and second light-guides is configured to guide light from an incoupling surface of the light-guide to an outcoupling surface of the light-guide through multiple reflections of said light at a boundary surface of said light-guide.

4. The light-output device according to claim 3, wherein said at least one light-guide is configured to guide said light through total internal reflection.

5. The light-output device according to claim 3, wherein said first light-guide has a cross-section area that decreases with increasing distance from said incoupling surface.

6. The light-output device according to claim 5, wherein said light-guiding system further comprises a third light-guide, and wherein:
   said first light-guide is sandwiched between said second light-guide and said third light-guide; and
   each of said second and third light-guides has a cross-section area that increases with increasing distance from said incoupling surface, in such a way that a total cross-section area of said light-guiding system is substantially constant along said light-guiding system.

7. The light-output device according to claim 6, wherein said second light-guide comprises a reflector arranged to direct said light through the outcoupling surface of the second light-guide.

8. The light-output device according to claim 7, wherein said light-guiding system is rotatable relative to said light-source arrangement around an axis of rotation.

9. The light-output device according to claim 8, wherein said light-guiding system is rotatable in a plane perpendicular to said axis of rotation.

10. The light-output device according to claim 8, wherein said light-guiding system is arranged substantially in parallel with said axis of rotation.

11. The light-output device according to claim 10, wherein said light-source arrangement comprises a light-source arranged offset from said axis of rotation.

12. The light-output device according to claim 7, wherein said light-guiding system is displaceable relative to said light-source arrangement.

13. The light-output device according to claim 12, wherein said light-guiding system comprises a first portion and a second portion, the first portion being rotatable relative the second portion.

14. The light-output device according to claim 13, wherein said light-source arrangement comprises a light-emitting diode, a heat sink arranged in thermal connection with said light-emitting diode, and a driver for providing power to the light-emitting diode.

15. A light-output device according to claim 1, wherein the light mixing devices are light mixing chambers.

* * * * *